United States Patent
Annamalai

(10) Patent No.: US 7,158,500 B2
(45) Date of Patent: Jan. 2, 2007

(54) METHOD AND APPARATUS FOR MOBILE LOCATION CENTER TO MOBILE LOCATION CENTER COMMUNICATION IN THE PACKET-SWITCHED DOMAIN

(75) Inventor: Magesh Annamalai, Boca Raton, FL (US)

(73) Assignee: Siemens Communications, Inc., Boca Raton, FL (US)

( * ) Notice: Subject to any disclaimer, the term of this patent is extended or adjusted under 35 U.S.C. 154(b) by 731 days.

(21) Appl. No.: 10/185,142

(22) Filed: Jun. 28, 2002

(65) Prior Publication Data

US 2004/0202194 A1 Oct. 14, 2004

(51) Int. Cl.
*H04Q 7/24* (2006.01)
(52) U.S. Cl. .................... 370/338; 455/456.2
(58) Field of Classification Search .............. None
See application file for complete search history.

(56) References Cited

U.S. PATENT DOCUMENTS

| | | | |
|---|---|---|---|
| 6,463,288 B1 | 10/2002 | Havinis et al. | |
| 6,597,916 B1 | 7/2003 | Edge | |
| 2002/0065086 A1* | 5/2002 | Vanttinen et al. | 455/456 |
| 2002/0086682 A1* | 7/2002 | Naghian | 455/456 |
| 2002/0107028 A1* | 8/2002 | Rantalainen et al. | 455/456 |
| 2002/0110096 A1* | 8/2002 | Carlsson et al. | 370/328 |
| 2004/0072576 A1* | 4/2004 | Nuutinen et al. | 455/456.1 |

OTHER PUBLICATIONS

Muller, Frank et al. "Further Evolution of the GSM/EDGE Radio Access Network". Ericsson Review No. 3, 2001. pp. 116-123.

"3GPP TS 43.059 v5.3.0 (Apr. 2002)", 3d Generation Partnership Project; Technical Specification Group GSM/EDGE Radio Access Network; Functional Stage 2 Description of Location Services (LCS) in GERAN (Rel 5). 63pp.

"3GPP TS 48.018 v5.3.0 (May 2002)", 3d Generation Partnership Project; Technical Specification Group GSM/EDGE Radio Access Network; General Packet Radio Service (GPRS); Base Station System (BSS)-Serving GPRS Support Node (SGSN); BSS BPRS Protocol (BSSGP) (Rel 5). 93pp.

"3GPP TS 48.031 v4.1.0 (Jun. 2001)", 3d Generation Partnership Project; Technical Specification Group GSM EDGE Radio Access Network; Location Services (LCS); Serving Mobile Location Centre—Serving Mobile Location Centre (SMLC-SMLC); SMLCPP Specificaton (Rel. 4). 31pp.

* cited by examiner

*Primary Examiner*—Chau Nguyen
*Assistant Examiner*—Thien D. Tran

(57) ABSTRACT

A system, method, apparatus, means, and computer program code for requesting location data in a communications network, where the communications network includes a first base station server (BSS) in communication with a first serving mobile location center (SMLC), and a second BSS in communication with a second SMLC and a location measurement unit (LMU) under control of the second SMLC, the first and second BSS in communication with a serving general packet radio service support node (SGSN). According to some embodiments, a request for location data is generated at the first SMLC and is submitted to the first BSS using a packet-switched communications protocol. The first BSS forwards the request for location data to the SGSN using a packet-switched communications protocol. A response to the request for location data, generated by the second SMLC, is received. In some embodiments, the response can include a positive or a negative acknowledgement from the second SMLC.

10 Claims, 4 Drawing Sheets

METHOD AND APPARATUS FOR MOBILE LOCATION CENTER TO MOBILE LOCATION CENTER COMMUNICATION IN THE PACKET-SWITCHED DOMAIN

BACKGROUND

The present invention generally relates to a method and apparatus for communication. More particularly, embodiments of the present invention relate to methods and apparatus for communication between serving mobile location centers (SMLCs) in the packet-switched domain.

Location-based services are an increasingly important aspect of communication networks. In the United States, for example, the Federal Communications Commission (FCC) requires certain wireless networks to provide the ability to identify the location of mobile devices in the network. Throughout the world, applications are being developed to support consumer and business location-based services in wireless networks.

Several location methods are standardized to position mobile devices. For example, Enhanced Observed Time Difference (E-OTD) and Assisted GPS (A-GPS) are two positioning methods widely used in digital mobile communication systems. Several new network nodes have been introduced to support positioning methods in wireless networks. In the radio sub system, serving mobile location center (SMLC) and location measurement unit (LMU) nodes are used to support positioning. LMUs make radio measurements to support one or more positioning methods. Data from an LMU, including timing and assistance data, are provided to an associated serving mobile location center (SMLC). Each SMLC may be an integrated function in a radio base station system or it may be a stand-alone network element within a radio access network. Each SMLC manages the overall coordination and scheduling of resources required to provide location-based services of each mobile device in the area. The SMLC may control a number of LMUs to help locate each mobile device in the area served by the SMLC. A public land mobile network (PLMN) may include a number of SMLCs.

Each SMLC in the PLMN may need to request or provide location information to other SMLCs in the PLMN. Currently, this sharing of location information between SMLCs is performed using direct connections between SMLCs (e.g., using Signaling System 7 or "SS7") connections, or using circuit-switched connections through a base station subsystem (e.g., through signaling transfer points, or "STPs"). Unfortunately, if there is no direct SS7 or links to an STP which would allow this intercommunication between two SMLCs, there is currently no way that the two SMLCs could share location information. If a network operates in a packet-switched mode, it is possible that no direct SS7 link or link to an STP will be available between two SMLCs.

One particular network architecture which is being developed and which does not currently support packet-switched intercommunication between SMLCs is the network architecture resulting from the merger of global system for mobile communication (GSM)/Enhanced Data rates for Global Evolution (EDGE) ("GERAN") with universal mobile telecommunications system (UMTS). This merger is part of a migration toward third-generation wireless systems which merge aspects of GERAN high-speed transmission with aspects of the UMTS core networks. The alignment of GERAN with UMTS to provide a high-speed, high-bandwidth communications network is supported by standards activities governed by the "$3^{rd}$ Generation Partnership Project" (3GPP™), whose standards are located at www.3gpp.org. Unfortunately, as described above, existing work in aligning GERAN with UMTS does not support communication between SMLCs in a network using a packet-switched protocol to pass location information from one SMLC to another.

It would be advantageous to provide a method and apparatus that overcame the drawbacks of previous systems. In particular, it would be desirable to provide a system, method, apparatus, means and computer program code for allowing communication between two SMLCs in a packet-switched mode. It would further be desirable to provide such communication to allow the sharing of location information between SMLCs.

SUMMARY

Embodiments of the present invention provide a system, method, apparatus, means, and computer program code for requesting location data in a communications network, where the communications network includes a first base station server (BSS) in communication with a first serving mobile location center (SMLC), and a second BSS in communication with a second SMLC and a location measurement unit (LMU) under control of the second SMLC, the first and second BSS in communication with a serving general packet radio service support node (SGSN). According to some embodiments, a request for location data is generated at the first SMLC and is submitted to the first BSS using a packet-switched communications protocol. The first BSS forwards the request for location data to the SGSN using a packet-switched communications protocol. A response to the request for location data, generated by the second SMLC, is received. In some embodiments, the response can include a positive or a negative acknowledgement from the second SMLC.

According to some embodiments, a system, method, apparatus, means and computer program code are provided for responding to a request for location information, and include: receiving, at a first serving mobile location center (SMLC), a request for location information; retrieving location information from a location measurement unit (LMU) under control of the first SMLC; and transmitting the location information to a first base station server (BSS) using a packet-switched protocol, the first BSS forwarding the location information to a serving general packet radio service support node (SGSN) over a packet-switched protocol for transmission to a second BSS over the packet-switched protocol. In some embodiments, the location information includes radio interference timing information maintained by the LMU under control of the first SMLC.

With these and other advantages and features of the invention that will become hereinafter apparent, the nature of the invention may be more clearly understood by reference to the following detailed description of the invention, the appended claims and to the several drawings attached herein.

DETAILED DESCRIPTION OF SPECIFIC EMBODIMENTS

There is a need for systems, methods, apparatus, means and computer program code for allowing packet-switched communication between serving mobile location centers (SMLCs) in a communications network. Preferably, the systems, methods, apparatus, means and code allow SMLCs in a communications network to request, receive, and submit location information from location measurement units (LMUs) in the network.

Figure 1:
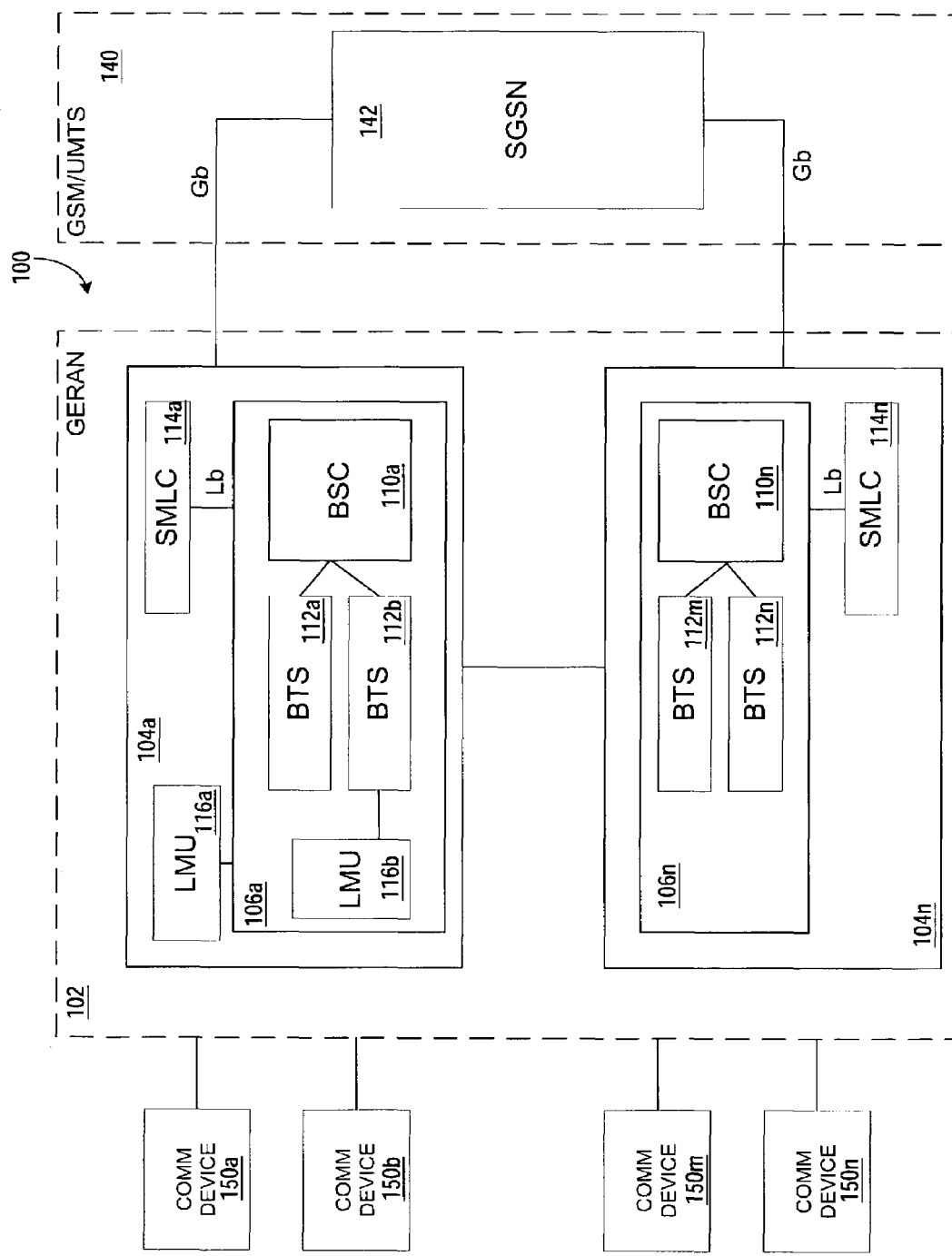
FIG. 1 is a block diagram of system components for an embodiment of a system in accordance with the present invention.

Embodiments of the present invention will now be described by reference to the figures. FIG. 1 is a block diagram depicting a communications network 100. In one embodiment, communications network 100 includes a combination of technologies and protocols, including packet-switched components and global system for mobile communication (GSM) components. For example, in one embodiment, as depicted in FIG. 1, network 100 includes a GSM/enhanced data rates for global evolution (EDGE) network (referred to as "GERAN" or element 102 of FIG. 1) in communication with a GSM/universal mobile telecommunications system (UMTS) network (referred to as GSM/UMTS or element 140 of FIG. 1). Network 100 is configured to facilitate communication by and among a number of communications devices 150a–150n. Communications devices 150a–150n may be any of a number of devices adapted to communicate over network 100, such as, for example mobile telephones, computing devices, workstations, or the like.

As depicted in FIG. 1, GERAN network 102 may include a number of base station subsystems (BSS) 106a–n. Although only two BSS 106a, 106n are depicted, those skilled in the art will appreciate that a typical network will include a number of BSS 106. Each BSS 106 may be associated with a particular communications cell in network 100. Each BSS 106 typically includes a base station controller (BSC) 110 and one or more base transceiver systems (BTS) 112. Each BTS 112 operates in conjunction with one or more transmitters (not shown) which provide a bi-directional radio link to individual communications devices 150. Communication links between BTS 112 and communication devices 150 are controlled and managed by BSC 110, allowing communication by and among devices in the network.

Network 100 also provides location-based services. In one embodiment, these location-based services are provided using timing and location information generated and maintained by one or more location measurement units (LMUs). Each LMU is configured to make radio measurements to support one or more positioning methods. For example, LMUs may be configured to make measurements and to provide information relating to global positioning system (GPS) location information, network assisted GPS (A-GPS), enhanced-observed time difference (E-OTD), or the like. The location information maintained and provided by LMUs will be referred to herein generally as radio interference timing (RIT) information.

In the embodiment depicted, two LMUs are shown (LMU 116a and 116b), both of which are in communication with BSS 106a. The timing and other position information maintained and generated by each LMU is managed by a serving mobile location center (SMLC) 114. Each SMLC 114 includes functionality designed to support location-based services in network 100. In general, SMLC 114 contains functionality required to coordinate and schedule resources used to provide location information about individual communications devices 150 in network 100. For example, SMLC 114 calculates, based on data from LMU 116, the location of a particular communication device in a cell supported by the SMLC 114.

In some network configurations, one or more BSS 106 are provided without any LMU 116. For example, in the network depicted in FIG. 1, BSS 106n has an SMLC 114n, but does not have an LMU. BSS 106a, however, does have an LMU (and, in the configuration depicted, has two LMUs 116a, 116b). Thus, in order to support location-based services for communication devices 150m–n, BSS 106n must request and receive location data from another BSS which does have an LMU. Pursuant to embodiments of the present invention, this location data may be requested and provided from an SMLC associated with one BSS to an SMLC associated with another BSS using a packet-switched protocol. In this manner, SMLCs may share location-based data even if a dedicated SS7 interface is not provided, and without need for circuit-switched communication through signaling transfer points.

To describe features of embodiments of the present invention, SMLC 114n (the SMLC associated with BSS 106n and without any LMU) will be referred to herein as the "client" SMLC, while SMLC 114a (the SMLC associated with BSS 106a and receiving RIT data from one or more LMU 116a,b) will be referred to herein as the "serving" SMLC. Those skilled in the art will appreciate that a number of SMLCs may be provided in a PLMN, any number of which may act as either a "client" or a "serving" SMLC pursuant to embodiments of the present invention.

Network 100, in one embodiment, operates in the general packet radio service (GPRS) domain. GPRS is a packet-switched protocol which may be used in GSM networks and which allows data to be sent and received across a network, supplementing circuit-switched and short message service communication protocols. Applicant has discovered that the GPRS protocol may be used to support communication between SMLCs in network 100 and, more particularly, to support the communication of location information between SMLCs in network 100.

In a network operating in the GPRS domain, an interface (Gb) is provided between individual BSS and one or more serving GPRS support nodes (SGSNs). This interface is depicted in FIG. 1, where SGSN 142 is shown in communication with BSS 106a, 106n over a Gb interface. In a typical GPRS network, the Gb interface between BSS and SGSN is a frame relay connection. Typically, a number of frame relay channels are provided to support multiple BSS to SGSN connections. Embodiments of the present invention utilize this interface to allow SMLCs associated with different BSS to request, receive and provide location-based information.

Figure 2:
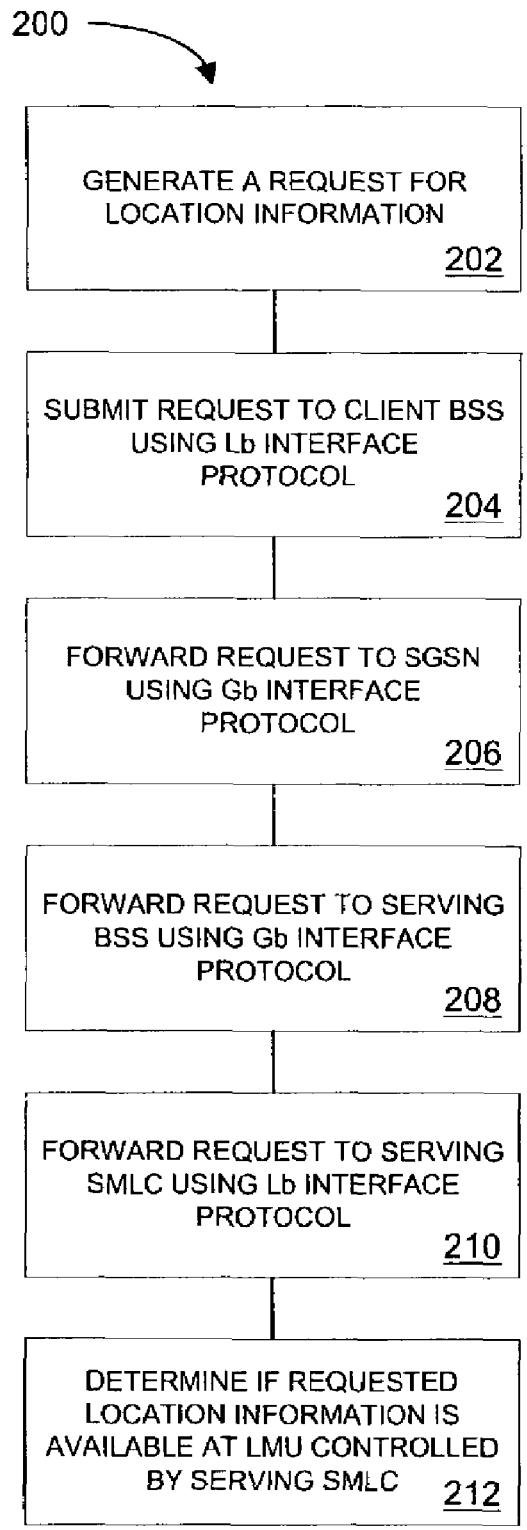
FIG. 2 is a flowchart of an embodiment of a communications method in accordance with the present invention and usable with the system of FIG. 1.

Referring now to FIG. 2, a process for requesting location information 200 will be described which may be implemented using the network 100 of FIG. 1. In describing the process of FIG. 2, a network configuration is assumed where at least one BSS is provided without any LMU and at least one BSS is provided with at least one LMU. The SMLC associated with the BSS without an LMU is referred to as the "client" SMLC. The SMLC associated with the BSS with at least one LMU is referred to as the "serving" SMLC.

Process 200 begins at 202 where a request for location information is generated. This request for location information may be generated by the client SMLC 114n. This request may be generated based on a location service request initiated on behalf of a communications device 150 in communication with BSS 106n. The client SMLC 114n may require RIT measurement information from a particular LMU which is not under its direct control. The request for location information may be formatted in accordance with a service primitive protocol utilized by the network and submitted (at 204) from the client SMLC 114n to BSS 106n over a packet-switched interface between SMLC 114n and BSS 106n (shown as the Lb interface in FIG. 1). Processing continues at 206 where BSS 106n routes the request to SGSN 142 using a packet-switched interface (designated as the Gb interface in FIG. 1). The request, in one embodiment, includes an identifier of client SMLC 114n as well as an identifier of a serving SMLC 114a from which location information is desired. The request may include other information, such as, for example an operation code which specifies the intended operation (e.g., such as a RIT query, a RIT indication request, a RIT query stop, or a request for an update of deciphering keys). Each of the operation codes may include one or more associated arguments further defining the request.

Process 200 continues at 208 where SGSN forwards the request to the serving BSS (BSS 110a of FIG. 1). The SGSN may forward the request to a particular serving BSS (e.g., based on information provided in the request generated at 202), or the SGSN may forward the request to a predetermined BSS designated to provide location data to the client BSS. The SGSN forwards the request to the serving BSS using the packet-switched protocol (i.e., over the Gb interface in the network depicted in FIG. 1).

At 210, the serving BSS (BSS 110a of FIG. 1) forwards the request to the serving SMLC (SMLC 114a of FIG. 1) for response. The serving SMLC, upon receipt of the request, determines if it is able to provide a response (processing at 212). In some situations, the serving SMLC may determined that it does not have the appropriate data to be responsive to the request and will respond with an error message indicating the request RIT data is not available. In other situations, the serving SMLC may determine that the requested location information is available. This may require communication between the serving SMLC and one or more LMUs in communication with the serving SMLC. If the requested RIT data is available, the serving SMLC constructs a response message for reply to the client SMLC.

Figure 3:
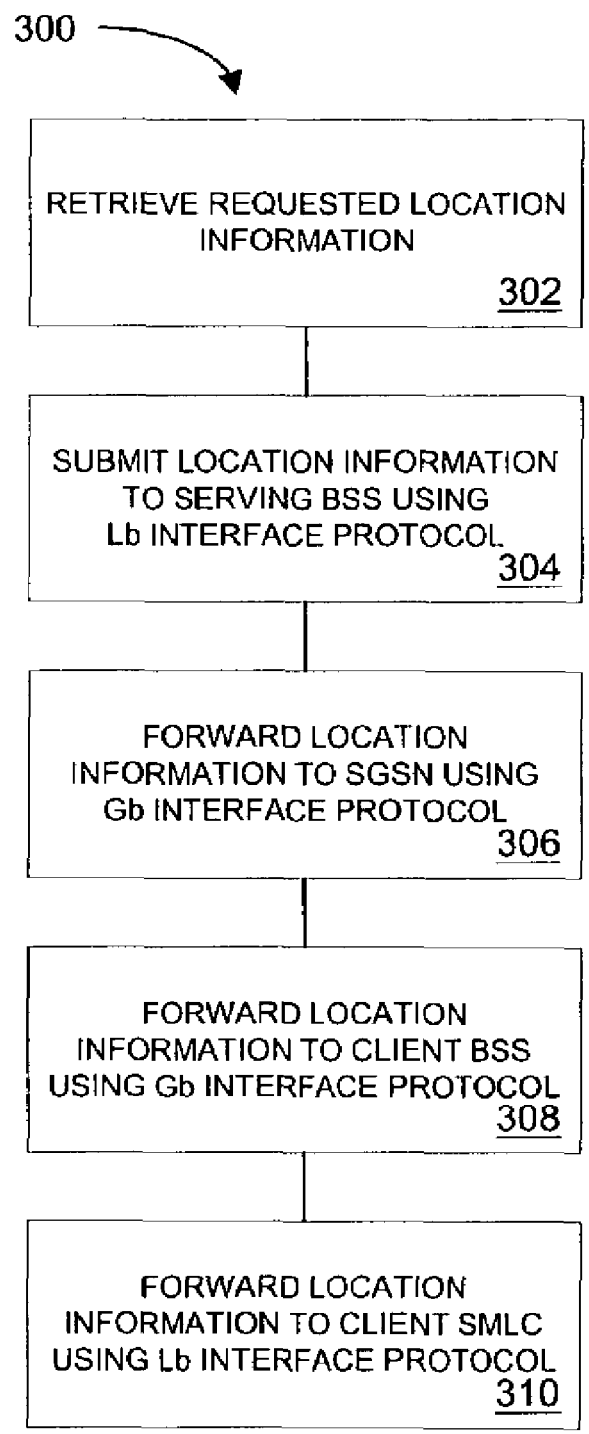
FIG. 3 is a flowchart of an embodiment of a further communications method in accordance with the present invention and usable with the system of FIG. 1.

Referring now to FIG. 3, a further process 300 is shown for responding to a location information request. Process 300 may be performed after receipt of a request for location information (e.g., following process 200 of FIG. 2). Processing begins at 302 where the serving SMLC retrieves the requested location information. This may involve querying one or more LMUs in communication with the serving SMLC to retrieve the requested RIT data. The retrieved data is used to construct a response message including information identifying the client SMLC to which the data is directed. An identifier may also be included in the response message tying the response to the original request so that the client SMLC can utilize the RIT data to provide location information to a particular communications device 150.

Processing continues at 304 where the response message is submitted to the serving BSS (BSS 106a of FIG. 1) over a packet-switched interface (shown as the Lb interface in the network of FIG. 1). The serving BSS, at 306, forwards the response including the location information to the SGSN using a packet-switched protocol (shown as SGSN 142 and interface Gb in the network of FIG. 1). Processing continues a 308 where the SGSN receives the response and identifies the client BSS and forwards the location information to the client BSS using a packet-switched protocol. The client BSS, upon receipt of the response message, forwards the response message to the client SMLC for processing. The client SMLC utilizes the received location information to provide location services to communication devices in the cell served by the client BSS. The client SMLC, in one embodiment, identifies a particular communication device for which the information pertains using an identifier contained in the response message.

In this manner, location services may be provided to communication devices operating in a network area which does not have a dedicated LMU associated with it. Further, the location services may be provided even if an SMLC in the network area does not have a direct SS7 or STP connection to another SMLC.

According to some embodiments, standardized protocols are used to generate, submit, receive, and respond to location information requests routed pursuant to the present invention. In one particular embodiment, network 100 is implemented using standards promulgated by the $3^{rd}$ Generation Partnership Project (3GPP™). Applicant believes that communication between a client SMLC and a serving SMLC pursuant to embodiments of the present invention may be implemented by specifying a signaling protocol between a client SMLC and a serving SMLC. Applicant believes that features of embodiments of the present invention may be implemented through modifications to existing communications protocols. For example, in one specific embodiment, implementation of features of embodiments of the present invention in 3GPP specifications may involve the addition of service primitives in a protocol governing communication between BSS and SGSN and the addition of service primitives in a protocol governing communication between SMLCs. Further, coding standards and operation codes utilized in the 3GPP specifications may be followed to support location communications between SMLCs in the packet domain (e.g., the RIT query, RIT indication, RIT query stop, and Deciphering Keys Update specified in 3GPP document number 48-031 may be utilized). An example protocol layer showing protocols which may be modified to implement features of embodiments of the present invention is depicted in FIG. 4.

Figure 4:
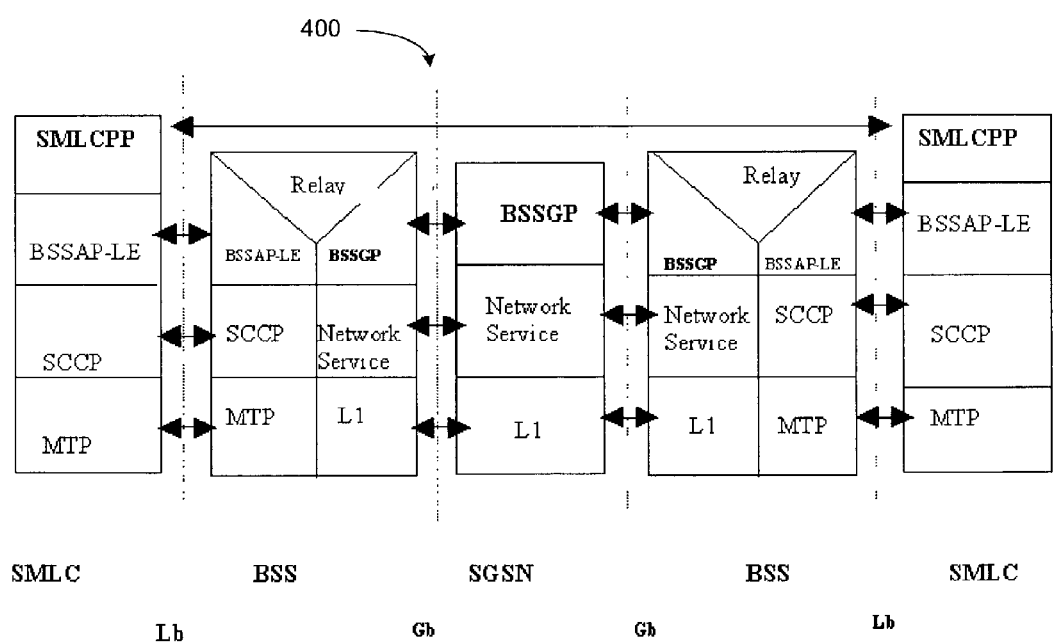
FIG. 4 is an illustration of a signaling protocol that may be used for communications between the first serving mobile location center and a second serving mobile location center in the system of FIG. 1.

As depicted in FIG. 4, communication between SMLCs is performed in the packet-switched domain by routing information from an SMLC to a BSS to a SGSN to a second BSS and finally to a second SMLC. Pursuant to some embodiments of the present invention, new service primitives are defined specifying the request and acknowledgement of location information, allowing a client SMLC to request location information from a serving SMLC in the packet-switched domain. In a network implemented using 3GPP protocols, the BSSGP protocols may be modified to implement features of the present invention. In particular, features of embodiments of the present invention may be implemented by modifying the BSSGP protocol governing communication between BSS and SGSN in the packet-switched domain (3GPP document number 48-018).

As a further example, the BSSGP protocol may be modified to specify information element coding relating to BSS application specific coding information. In one embodiment, existing service primitives defined by the BSSGP protocol may be used to route information from a client BSS to a serving BSS through a SGSN. These existing service primitives may include the primitives described at section 10.6 of 3GPP document number 48-018, or other similar primitives which may later be specified for use by 3GPP.

Information element coding may be specified to support SMLC-SMLC communications pursuant to embodiments of the present invention. In one embodiment, features of the present invention may be implemented by amending 3GPP standards to support features of embodiments of the present invention. In one embodiment, 3GPP document number 48-018 may be amended to assign a new application identifier to identify SMLC-SMLC communications conducted pursuant to the present invention. For example, the following radio access network information management ("RIM") application identifiers may be specified (where the SMLCPP protocol information transfer identifier is newly-assigned to identify an application pursuant to the present invention):

| RIM Application Identity IE | |
|---|---|
| 8 7 6 5 4 3 2 1 | |
| Octet 1 | IEI |
| Octet 2, 2a | Length Indicator |
| Octet 3 | RIM Application Identity |

An example of "RIM Application Identity" coding is depicted below:

| Coding | Semantic |
|---|---|
| 0000 0000 | Reserved |
| 0000 0001 | Network Assisted Cell Change (NACC) |
| 0000 0010 | SMLCPP protocol information transfer |
| 0000 0010—1111 1111 | Reserved |

As described above, 3GPP coding standards may also be utilized to implement SMLCPP operation codes such as, for example, RIT Query, RIT Indication, RIT Query stop and Deciphering keys Update.

Those skilled in the art will appreciate that features of embodiments of the present invention may be implemented in other ways as well. For example, new protocols may be established specifying communication between two SMLCs in a PLMN which operates in the packet switched domain and which supports the Gb interface, whereby a client SMLC may request location information from a serving SMLC in the PLMN.

Although the present invention has been described with respect to various embodiments thereof, those skilled in the art will note that various substitutions may be made to those embodiments described herein without departing from the spirit and scope of the present invention.

What is claimed:

1. A method for requesting location data in a communications network, the communications network including a first base station server (BSS) in communication with a first serving mobile location center (SMLC), and a second BSS in communication with a second SMLC and a location measurement unit (LMU) under control of said second SMLC, said first and second BSS in communication with a serving general packet radio service support node (SGSN), the method comprising:

generating, at said first SMLC, a request for location data;

submitting said request for location data to said first BSS using a packet-switched communications protocol and causing said first BSS to forward said request for location data to said SGSN using a packet-switched communications protocol; and receiving a response to said request for location data, said response generated by said second SMLC, wherein said response is a negative acknowledgement indicating a query error generated by said second SMLC.

2. A system for providing location measurement data, comprising:

a communications network including a serving general packet radio service support node (SGSN) in packet-switched communication with a first base station server (BSS) and a second BSS;

said first BSS in radio communication with a first serving mobile location center (SMLC), said first SMLC controlling a location measurement unit (LMU) generating location measurement data; and said second BSS in radio communication with a second SMLC, said second SMLC generating a request for location measurement data from said LMU and forwarding said request from said second BSS to said first BSS through said SGSN in a packet-switched format, wherein said first BSS replies to said request by forwarding location measurement data from said LMU to said second BSS through said SGSN in said packet-switched format.

3. The system of claim 2, wherein said first BSS replies to said request by forwarding a error message to said second BSS through said SGSN in said packet-switched format.

4. The system of claim 2, wherein said location measurement data includes radio interference timing measurement information and deciphering keys update procedure.

5. A method for providing location measurement data in a communications network, comprising:

communicating, by a serving general packet radio service support node (SGSN) in said communications network, using a packet-switched communication protocol with a first base station server (BSS) and a second BSS;

generating location measurement data by a location measurement unit (LMU);

communicating, by said first BSS, with a first serving mobile location center (SMLC) controlling said LMU;

communicating, by said second BSS, with a second SMLC;

generating, by said second SMLC, a request for location measurement data from said LMU; and forwarding said request from said second BSS to said first BSS through said SGSN in a packet-switched format; and replying to said request by said first BSS by forwarding location measurement data from said LMU to said second BSS through said SGSN in said packet-switched format.

6. The method of claim 5, wherein said first BSS replies to said request by forwarding a error message to said second BSS through said SGSN in said packet-switched format.

7. The method of claim 5, wherein said location measurement date includes radio interference timing measurement information and deciphering keys update procedure.

8. A computer program product in a computer readable medium for providing location data in a communications network, comprising:
- instructions for communicating, by a serving general packet radio service support node (SGSN) in said communications network, using a packet-switched communication protocol with a first base station server (BSS) and a second BSS;
- instructions for generating location measurement data by a location measurement unit (LMU);
- instructions for communicating, by said first BSS, with a first serving mobile location center (SMLC) controlling said LMU;
- instructions for communicating, by said second BSS, with a second SMLC;
- instructions for generating, by said second SMLC, a request for location measurement data from said LMU; and
- instructions for forwarding said request from said second BSS to said first BSS through said SGSN in a packet-switched format; and
- instructions for replying to said request by said first BSS by forwarding location measurement data from said LMU to said second BSS through said SGSN in said packet-switched format.

9. The computer readable medium of claim 8, wherein said first BSS replies to said request by forwarding a error message to said second BSS through said SGSN in said packet-switched format.

10. The computer readable medium of claim 8, wherein said location measurement data includes radio interference timing measurement information and deciphering keys update procedure.

* * * * *